(12) United States Patent
Basiletti et al.

(10) Patent No.: US 8,753,090 B2
(45) Date of Patent: Jun. 17, 2014

(54) BLADED DISK ASSEMBLY

(75) Inventors: Matthew Peter Basiletti, Lafayette, IN (US); Richard Christopher Uskert, Noblesville, IN (US); Michelle Lynn Tucker, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 661 days.

(21) Appl. No.: 12/954,206

(22) Filed: Nov. 24, 2010

(65) Prior Publication Data

US 2012/0128498 A1 May 24, 2012

(51) Int. Cl.
*F01D 5/32* (2006.01)

(52) U.S. Cl.
USPC ........................................ 416/221

(58) Field of Classification Search
USPC ...... 416/221, 220 R, 204 A, 215–218, 219 R, 416/244 A
See application file for complete search history.

(56) References Cited

U.S. PATENT DOCUMENTS

| | | | |
|---|---|---|---|
| 2,761,648 A | 9/1956 | Purvis | |
| 2,994,507 A | 8/1961 | Keller et al. | |
| 3,039,740 A | 6/1962 | Hockert | |
| 3,045,329 A | 6/1962 | Carli et al. | |
| 3,397,865 A * | 8/1968 | Shaw et al. | 416/221 |
| 3,501,249 A | 3/1970 | Scalzo et al. | |
| 3,807,898 A * | 4/1974 | Guy et al. | 416/220 R |
| 4,108,571 A | 8/1978 | Mawson | |
| 4,171,930 A * | 10/1979 | Brisken et al. | 416/220 R |
| 4,247,257 A * | 1/1981 | Benoist et al. | 416/221 |
| 4,349,318 A | 9/1982 | Libertini et al. | |
| 4,507,052 A | 3/1985 | Thompson | |
| 4,523,890 A * | 6/1985 | Thompson | 416/95 |
| 6,109,877 A | 8/2000 | Gekht et al. | |
| 6,315,298 B1 | 11/2001 | Kildea et al. | |
| 6,533,550 B1 | 3/2003 | Mills | |
| 6,726,452 B2 | 4/2004 | Strassberger et al. | |
| 7,264,447 B2 * | 9/2007 | Ono et al. | 416/193 A |
| 7,309,215 B2 | 12/2007 | Negulescu | |
| 7,540,714 B1 | 6/2009 | Dezouche | |
| 7,628,589 B2 | 12/2009 | Becker | |
| 7,780,419 B1 | 8/2010 | Matheny et al. | |
| 2009/0092497 A1 * | 4/2009 | Boeck | 416/220 R |

OTHER PUBLICATIONS

International Search Report and Written Opinion, PCT/US2011/062087, Rolls-Royce Corporation, May 21, 2012.

* cited by examiner

*Primary Examiner* — Nathaniel Wiehe
*Assistant Examiner* — Kayla McCaffrey
(74) *Attorney, Agent, or Firm* — Krieg DeVault LLP

(57) ABSTRACT

A bladed disk assembly includes a disk, a blade, and a retaining clip. The disk is centered on an axis. The disk has at least one groove extending along the axis. The blade is received in the groove. The retaining clip contacts the blade and limits movement of the blade along the axis. The retaining clip is engaged with the disk through a snap-fit.

19 Claims, 4 Drawing Sheets

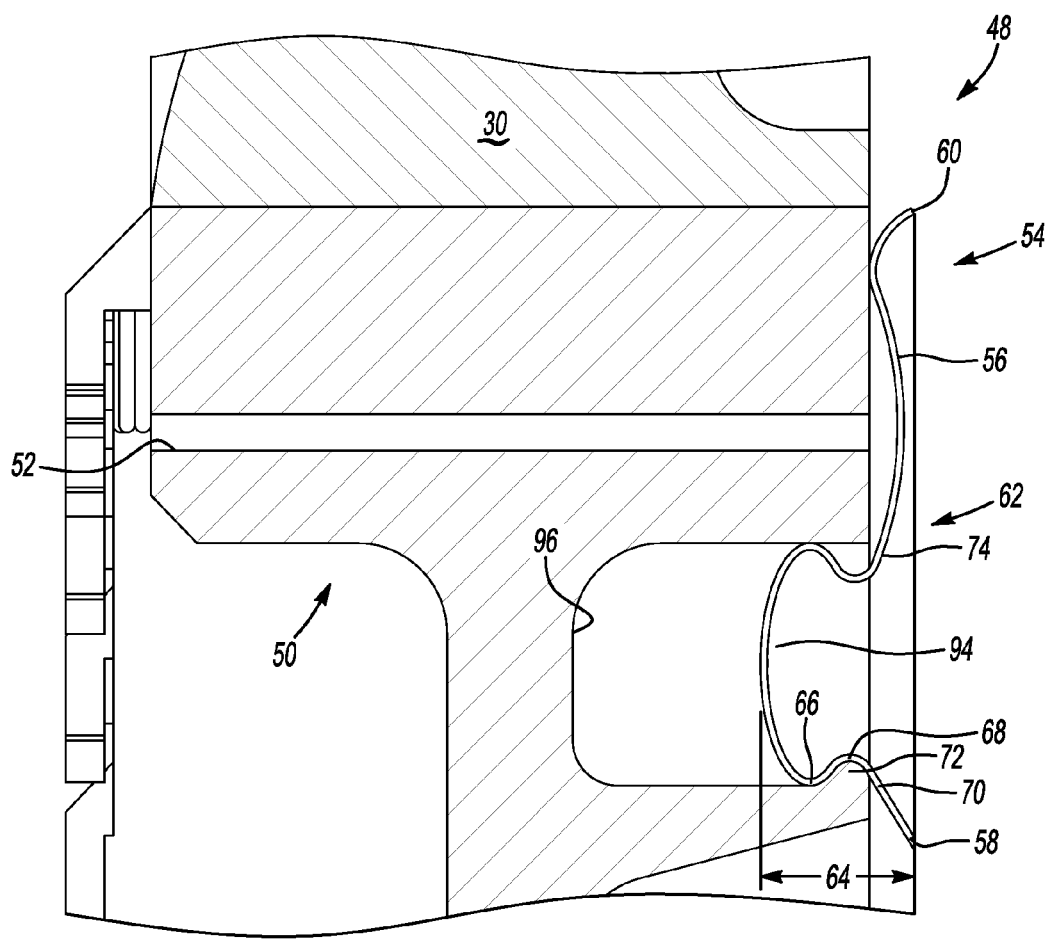
*Fig-3*
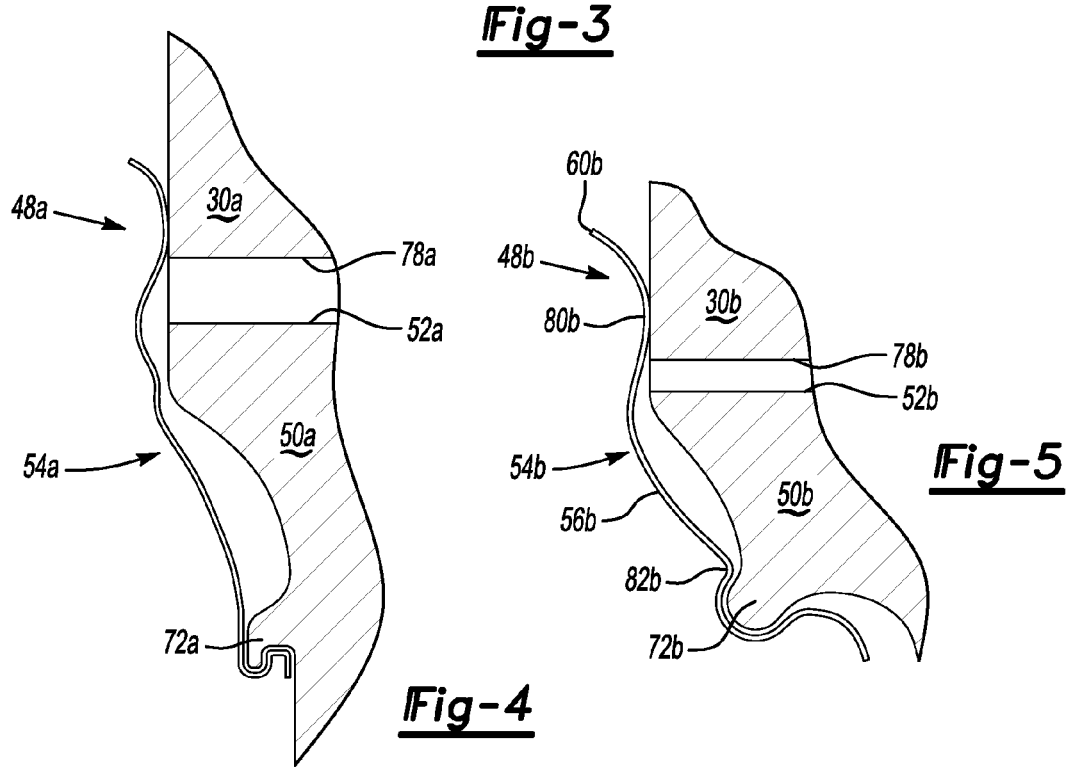
*Fig-4*
*Fig-5*

BLADED DISK ASSEMBLY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of FA8650-07-C-2803 awarded by the Department of Defense.

BACKGROUND OF THE INVENTION

1. Field of the Invention

The invention relates to a bladed disk assembly wherein one or more blades are mounted to a disk for concurrent rotation with the disk.

2. Description of Related Prior Art

U.S. Pat. No. 4,108,571 discloses a bladed rotor assembly for a gas turbine engine. In the '571 patent, a bladed rotor assembly for a gas turbine comprises blades whose roots are held in slots in a blade carrying member. In order to retain the blades against movement in the slots locking members engage with the blades and the member. At least one of the engagements comprises a projection defining an undercut into which an edge of the locking member engages. In order to reduce frettage, the edge and the undercut are shaped to form a groove which tapers so that its section reduces in the radially outward direction, and a wedging member is mounted in the groove so that it tends to centrifuge outward in the groove and wedge the edge in the undercut against a wall of the undercut.

SUMMARY OF THE INVENTION

In summary, the invention is a bladed disk assembly. The bladed disk assembly includes a disk centered on an axis. The disk has at least one groove oriented along the axis, or having some axial extent. The bladed disk assembly also includes a blade received in the groove. The bladed disk assembly also includes a retaining clip contacting the blade and limiting movement of the blade along the axis. The retaining clip is engaged with the disk through a snap-fit.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a planar view of the cross-section shown in perspective view in FIG. 2;

FIG. 4 is a cross-sectional view analogous to FIG. 3 but of an alternative embodiment of the invention;

FIG. 5 is a cross-sectional view analogous to FIG. 3 but of an alternative embodiment of the invention;

DETAILED DESCRIPTION OF EXEMPLARY EMBODIMENTS

Figure 1:
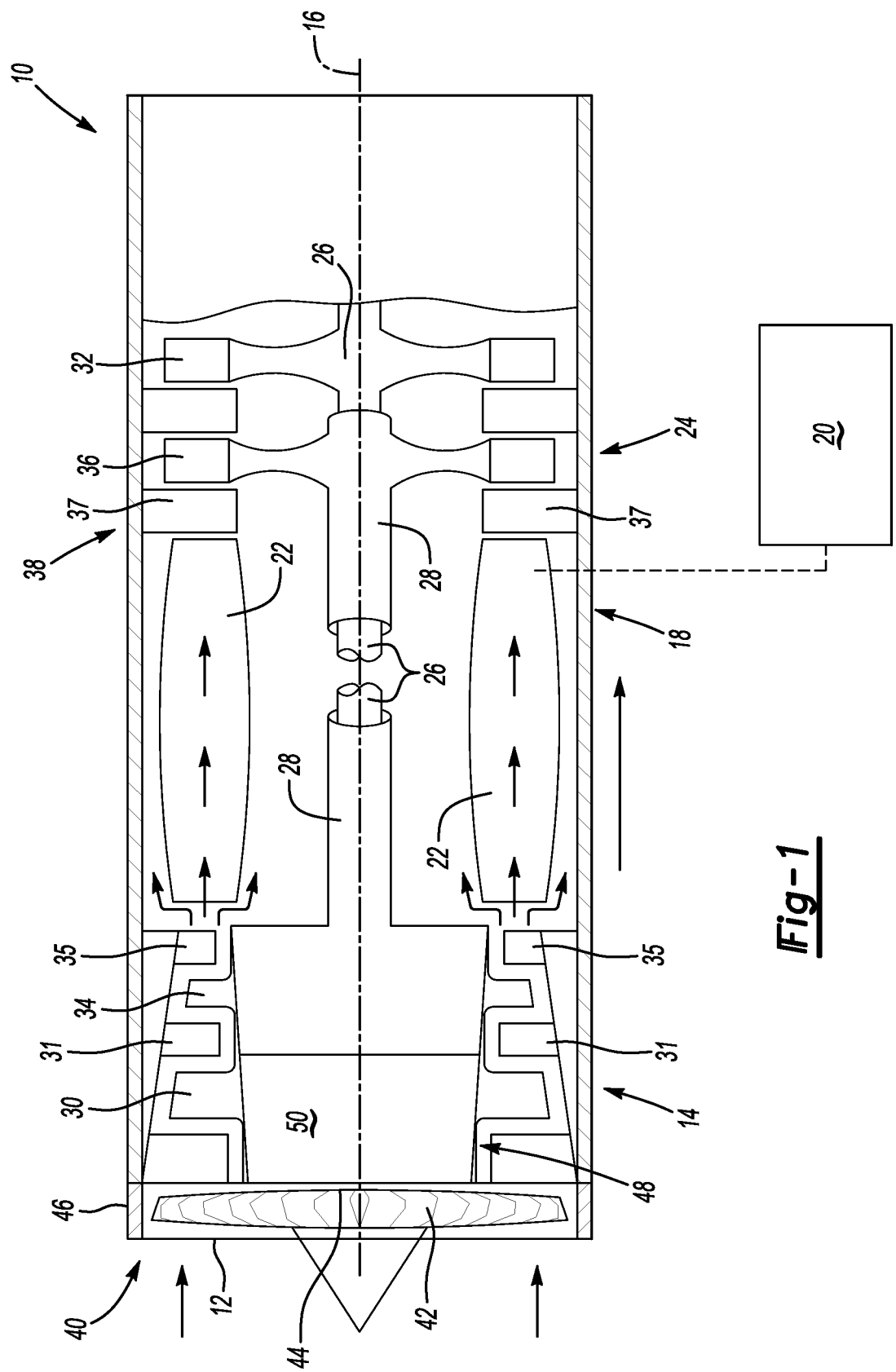
FIG. 1 is a schematic cross-section of a turbine engine incorporating an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiments described below, provides a structure for retaining a blade. Embodiments of the invention can be especially desirable for use with composite blades, organic matrix composite or ceramic matrix composite. However, it is noted that the invention is not limited to use with composite blades. Embodiments of the invention can replace smash plates. Smash plates are installed by placing the edges of a sheet metal component in a lip/groove feature on the disk and a similar, corresponding feature on the blades. The final segment of the plate is installed and then smashed in place to prevent the plates from popping out. Smash plates can cause damage to blades. Also, the use of smash plates requires forming the blade with a groove; this groove can be difficult to produce and can be a location for high stress concentration in the blade. Thus, embodiments of the invention can eliminate the need for applying any deforming force on the blades while retaining the components and also providing a sealing function.

It is noted that any benefits articulated herein may not be realized in all operating environments for all embodiments of the invention. Furthermore, it is noted that the benefits articulated herein are not exhaustive, other benefits may be perceived in the practice of the exemplary embodiment or in the practice of alternative embodiments of the invention. The benefits associated with the exemplary embodiments and described herein are not limitations of the broader invention, but rather demonstrate industrial applicability of the invention through the exemplary embodiments.

FIG. 1 schematically shows a turbine engine 10. The various unnumbered arrows represent the flow of fluid through the turbine engine 10. The turbine engine 10 can produce power for several different kinds of applications, including vehicle propulsion and power generation, among others. The exemplary embodiments of the invention disclosed herein, as well as other embodiments of the broader invention, can be practiced in any configuration of turbine engine and in any application other than turbine engines in which inspection of difficult to access components is desired or required.

The exemplary turbine engine 10 can include an inlet 12 to receive fluid such as air. The turbine engine 10 can include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. The compressor blades, such as blade 30, can be part of a bladed disk assembly 48 fixed for rotation with the shaft 26. The blade disk assembly 48 is shown schematically in FIG. 1. The bladed disk assembly 48 can includes a disk or rotor 50 fixed to the shaft 26 for concurrent rotation. The disk 50 can include a plurality of grooves (not visible in FIG. 1), each groove receiving a blade such as blade 30. A plurality of vanes 31 can be positioned to direct fluid downstream of the blades 30. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. The high pressure blades, such as blade 34, can be part of a bladed disk assembly such as described above with respect to the blade 30. A plurality of vanes 35 can be positioned to receive fluid from the blades 34. The shaft 28 can also support high pressure turbine blades 36 of a high pressure portion of the turbine section 24. A plurality of vanes 37 can be positioned to direct combustion gases over the blades 36.

The compressor section 14 can define a multi-stage compressor, as shown schematically in FIG. 1. A "stage" of the compressor section 14 can be defined as a pair of axially adjacent blades and vanes. For example, the vanes 31 and the blades 30 can define a first stage of the compressor section 14. The vanes 35 and the blades 34 can define a second stage of the compressor section 14. The invention can be practiced with a compressor having any number of stages.

A casing 38 defines a first wall and can be positioned to surround at least some of the components of the turbine engine 10. The exemplary casing 38 can encircle the compressor section 14, the combustor section 18, and the turbine section 24. In alternative embodiments of the invention, the casing 38 may encircle less than all of the compressor section 14, the combustor section 18, and the turbine section 24.

FIG. 1 shows the turbine engine 10 having a fan 40 positioned forward of the compressor section 14 along the centerline axis 16. The fan 40 can include a plurality of blades 42 extending radially outward from a hub 44. The fan 40 can be encircled by a fan case 46. The fan case 46 can be fixed to the casing 38. The casing 38 is shown schematically as being a single structure. In some embodiments of the invention, the casing 38 can be a single structure. In other embodiments of the invention, the casing 38 can be formed from a plurality of members that are fixed together. The forward-most member can be designated as a "front frame." The fan case 46 can be mounted to a front frame portion of the casing 38.

Figure 2:
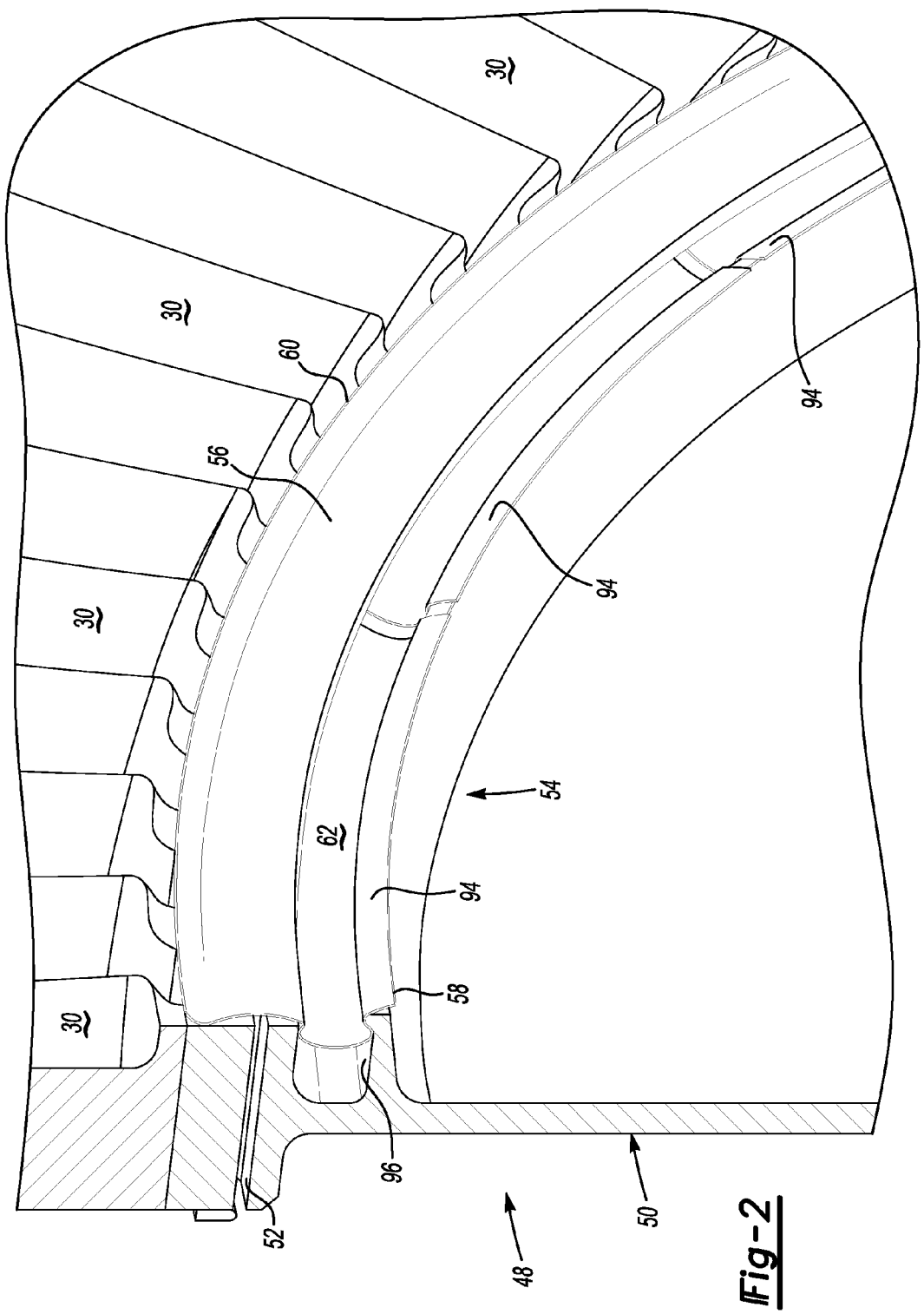
FIG. 2 is a perspective view of a bladed disk assembly according to an embodiment of the invention, with a portion cut-away to reveal a cross-section of the bladed disk assembly.

As set forth above, the blade 30 can be part of a bladed disk assembly 48. Shown schematically in FIG. 1, an exemplary bladed disk assembly 48 is shown in FIG. 2, a detailed perspective view with a portion cut-away. FIG. 3 shows a planar view of the cross-section shown in FIG. 2. The bladed disk assembly 48 includes a disk 50 centered on an axis, such as the axis 16 shown in FIG. 1. The disk 50 has a plurality of grooves extending along the axis, or at some skewed angle relative to the axis, such as the groove 52. Generally, the grooves are shaped similarly and extend parallel to one another, or at consistent angles to the assembly centerline axis. A blade, such as blade 30, is received in the groove 52.

The bladed disk assembly 48 also includes a retaining clip 54 to limit movement of the blade 30 along the axis 16. The retaining clip 54 contacts the blade 30. The retaining clip 54 is engaged with the disk 50 through a snap-fit. A snap-fit is self-locking joint whose mating parts exert a cam action during assembly, wherein at least one of the parts is elastically deformed until slipping past a raised lip on the other part. The first part elastically recovers after passing the raised lip of the other part and thereby prevents separation of the parts. In the exemplary embodiments, the retaining clip 54 is operable to elastically deform during engagement with the disk 50. However, the invention is not so limited.

The exemplary retaining clip 54 includes a disc portion 56 that is at least partially arcuate and centered on the axis 16. The exemplary disc portion 56 is fully arcuate or circular, but embodiments of the invention can be practiced differently. For example, a plurality of partially-arcuate disc portions 56 can be positioned circumferentially adjacent to one another about an axis. The retaining clip 54 can extend radially outward relative to the axis 16 from an inner end 58 to an outer end 60. The disc portion 56 can be the portion of the retaining clip 54 proximate to the outer end 60 and can contact the blade 30 to limit movement of the blade 30 along the axis 16. This is best shown in FIG. 3.

The exemplary retaining clip 54 also includes a retaining portion 62. The retaining portion 62 extends a length along the axis 16, referenced at 64 in FIG. 3. The retaining portion 62 can be a variable distance from the axis 16 along the length 64. For example, at a first position referenced at 66 along the length 64, the retaining portion 62 is a first distance from the axis 16. The axis 16 would be below the edge of the paper in FIG. 3. At a second position referenced at 68 along the length 64, the retaining portion 62 is a second distance from the axis 16 greater than the first distance. At a third position referenced at 70 along the length 64 the retaining portion 62 is a third distance from the axis 16 less than the second distance. Part of the disk 50, referenced at 72, is positioned directly between the first position 66 and the third position 70 along the axis 16. The retaining portion 62 can thus wrap around part 72 of the disk 50.

The retaining portion 62 can be integrally-formed and unitary with the disc portion 56, as shown in FIGS. 2 and 3. The retaining clip 54 can be a stamped, sheet metal structure and take numerous forms in various embodiments of the invention. Alternatively, the retaining clip 54 may be machined from forging, bar or plate stock, or cast material. FIGS. 2 and 3 show an embodiment in which the retaining portion 62 overlaps itself along the length 64. The section of the retaining portion 62 extending between points referenced at 68 and 74 can be elastically deformed during assembly to enhance the snap-lock defined between retaining portion 62 (at positions 66, 68, 70) and the part 72. In other words, the section between positions 68 and 74 can be spring-like and bias the retaining clip 54 against the part 72. The inner end 58 can be used as a "pull tab" for the removal of the retaining clip 54. By lifting and pulling on the inner end 58 with a tool, such as a pair of pliers, the spring portion of the clip 54 is deformed radially outward such that the detent feature can be lifted over feature 72.

FIG. 4 shows an alternative embodiment of the invention. A bladed disk assembly 48a includes a disk 50a centered on an axis, such as the axis 16 shown in FIG. 1. The disk 50a has a plurality of grooves extending along the axis 16, such as the groove 52a. A blade, such as blade 30a, is received in the groove 52a. The bottom of the blade 30a is referenced at 78a. The bladed disk assembly 48a also includes a retaining clip 54a to limit movement of the blade 30a along the axis 16. The retaining clip 54a contacts the blade 30a. The retaining clip 54a is engaged with the disk 50a through a snap-fit. FIG. 4 shows that a retaining clip according to an embodiment of the invention need not overlap itself along the axis 16 (as shown in the first embodiment) and can snap onto a part 72a of the disk 50a facing radially inwardly. The part 72 shown in FIG. 3, on the other hand, faces radially outwardly.

FIG. 5 shows another alternative embodiment of the invention. A bladed disk assembly 48b includes a disk 50b centered on an axis, such as the axis 16 shown in FIG. 1. The disk 50b has a plurality of grooves extending along the axis 16, such as the groove 52b. A blade, such as blade 30b, is received in the groove 52b. The bottom of the blade 30b is referenced at 78b. The bladed disk assembly 48b also includes a retaining clip 54b to limit movement of the blade 30b along the axis 16. The retaining clip 54b contacts the blade 30b. The retaining clip 54b is engaged with the disk 50b through a snap-fit. In FIG. 5, the exemplary retaining clip 54b can engage part 72b of the disk 50b in a snap-fit.

FIG. 5 shows that a disc portion 56b can bow along the axis, away from the disk 50b. In operation, fluid pressure can act on the disc portion 56b and partially or fully flatten the disc portion 56b. The surface of the disc portion 56b facing away from the disk 50b can thus define a pressure face. When the disc portion 56b is partially or fully flattened, a seal between the retaining portion 54b and the disk 50b can be enhanced. Also, as the disc portion 56b is partially or fully flattened, a radially outer end 60b of the retaining clip 54b can be urged radially outward. The retaining clip 54b can define a radially sliding contact engaging the blade 30, referenced at 80b. It is noted that the previously described embodiments also include a bowed disc portion and sliding contact. The sliding contact 80b can be at least partially arcuate, like a runner of a sled, in a cross-section including the axis 16, such as shown in FIG. 5.

As the bowed disc portion 56b flattens, the snap-fit defined between the retaining clip 54b and the part 72b can limit radially inward movement of the disc portion 56b. For example, the engagement between a position of the retaining clip 54b referenced at 82b and the part 72b provides a hard stop against radially inward movement of the retaining clip 54b. In embodiments of the invention wherein the retaining clip 54b is fully circular, the shape of the retaining clip 54b itself will limit radially inward movement of the disc portion 56b in response to pressure acting on the pressure face. However, for embodiments that are less than fully circular, deformation of the pressure face could more easily cause the retaining portion 62b to move radially inward. In some embodiments such as the one shown in FIG. 5, the engagement between the retaining portion 62b and the disk 50b defines an anchor point resisting this radially inward movement. The snap-fit between the retaining clip 54b and the disk 50b is thus such that the snap-fit limits movement of the retaining clip 54b radially and axially relative to the axis 16.

Figure 6:
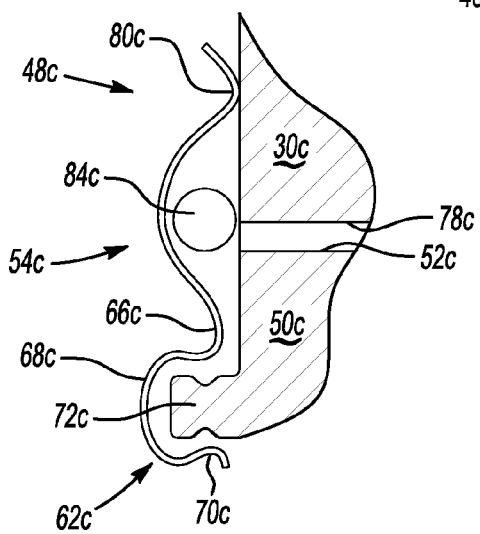
FIG. 6 is a cross-sectional view analogous to FIG. 3 but of an alternative embodiment of the invention.

FIG. 6 shows an alternative embodiment of the invention. A bladed disk assembly 48c includes a disk 50c centered on an axis, such as the axis 16 shown in FIG. 1. The disk 50c has a plurality of grooves extending along the axis 16, such as the groove 52c. A blade, such as blade 30c, is received in the groove 52c. The bottom of the blade 30c is referenced at 78c. The bladed disk assembly 48c also includes a retaining clip 54c to limit movement of the blade 30c along the axis 16. The retaining clip 54c contacts the blade 30c. The retaining clip 54c is engaged with the disk 50c through a snap-fit. In FIG. 6, the exemplary retaining clip 54c can engage a part 72c of the disk 50c in a snap-fit. At a first position referenced at 66c along its length, a retaining portion 62c of the retaining clip 54c is a first distance from the axis 16. At a second position referenced at 68c along its length, the retaining portion 62c is a second distance from the axis 16 less than the first distance. At a third position referenced at 70c along its length, the retaining portion 62c is a third distance from the axis 16 less than the second distance. The part 72c is thus positioned directly, radially between the first position 66c and the third position 72c relative to the axis 16.

FIG. 6 also shows that embodiments of the invention can include a separate seal. A seal member 84c can be positioned between the retaining clip 54c and the blade 30c, radially inward of a sliding contact 80c. A circular seal member 84c is shown for illustrative purposes. However, a seal member included as part of an embodiment of the invention can take any shape and can be formed from any material appropriate in view of the operating environment.

Figure 7:
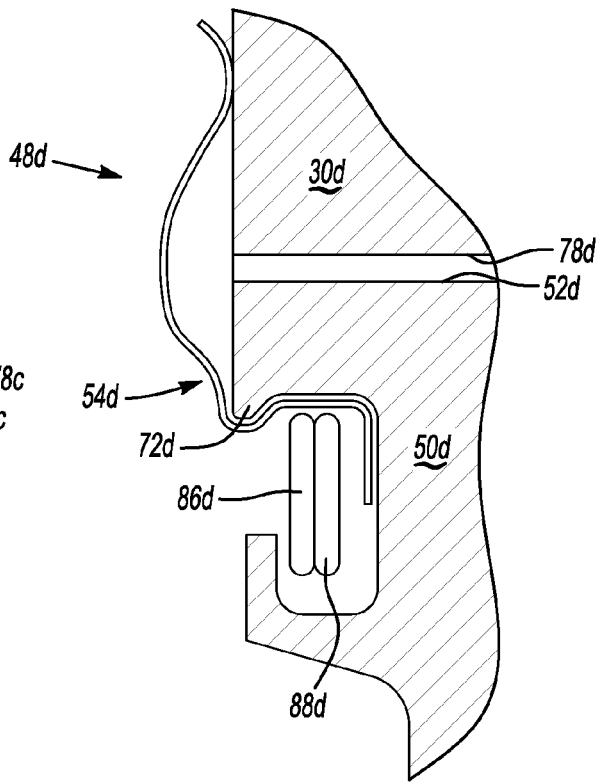
FIG. 7 is a cross-sectional view analogous to FIG. 3 but of an alternative embodiment of the invention.
Figure 8:
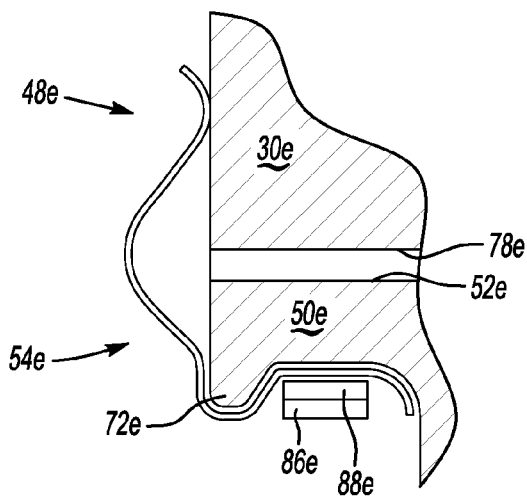
FIG. 8 is a cross-sectional view analogous to FIG. 3 but of an alternative embodiment of the invention.

FIGS. 7 and 8 show alternative embodiments of the invention. In FIG. 7, a bladed disk assembly 48d includes a disk 50d having a plurality of grooves extending along the axis 16, such as the groove 52d. A blade, such as blade 30d, is received in the groove 52d. The bottom of the blade 30d is referenced at 78d. The bladed disk assembly 48d also includes a retaining clip 54d to limit movement of the blade 30d along the axis 16. The retaining clip 54d contacts the blade 30d. The retaining clip 54d is engaged with the disk 50d through a snap-fit. In FIG. 7, the exemplary retaining clip 54d can engage a part 72d of the disk 50d in a snap-fit. In FIG. 8, a bladed disk assembly 48e includes a disk 50e having a plurality of grooves extending along the axis 16, such as the groove 52e. A blade, such as blade 30e, is received in the groove 52e. The bottom of the blade 30e is referenced at 78e. The bladed disk assembly 48e also includes a retaining clip 54e to limit movement of the blade 30e along the axis 16. The retaining clip 54e contacts the blade 30e. The retaining clip 54e is engaged with the disk 50e through a snap-fit. In FIG. 7, the exemplary retaining clip 54e can engage a part 72e of the disk 50e in a snap-fit.

Both of the embodiments shown in FIGS. 7 and 8 include retaining rings to limit movement of the respective retaining portions relative to the respective disk portions. In FIG. 7, retaining rings 86d and 88d are inserted along the axis. In FIG. 8, retaining rings 86e and 88e are inserted along the axis. The retaining rings could be replaced with a spiral-wound type snap ring for retaining the clip 54. The spiral-wound ring can have two winds in one ring, appearing as two separate structures in the cross section view.

Figure 9:
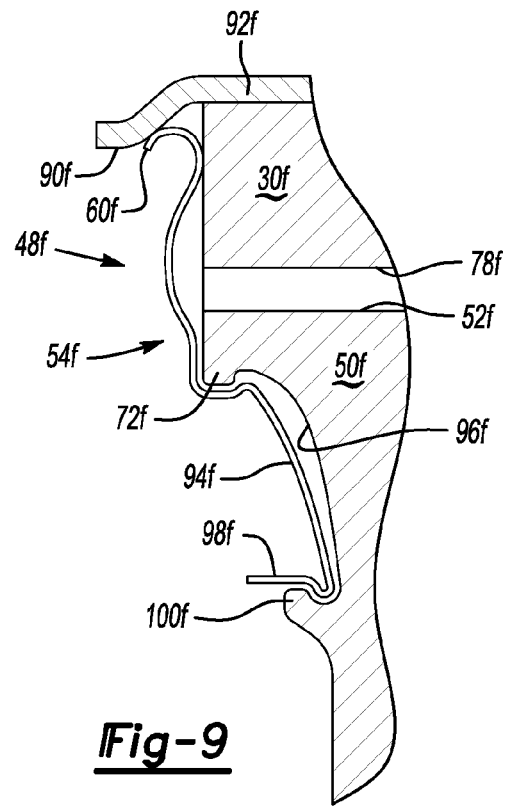
FIG. 9 is a cross-sectional view analogous to FIG. 3 but of an alternative embodiment of the invention.

FIG. 9 shows another embodiment of the invention. A bladed disk assembly 48f includes a disk 50f having a plurality of grooves extending along the axis 16, such as the groove 52f. A blade, such as blade 30f, is received in the groove 52f. The bottom of the blade 30f is referenced at 78f. The bladed disk assembly 48f also includes a retaining clip 54f to limit movement of the blade 30f along the axis 16. The retaining clip 54f contacts the blade 30f. The retaining clip 54f is engaged with the disk 50f through a snap-fit. In FIG. 9, the exemplary retaining clip 54f can engage a part 72f of the disk 50f in a snap-fit.

In the embodiment shown in FIG. 9, the radially-outer end 60f is curled and contacts a radially-inner side 90f of a platform 92f of the blade 30f. The radially-outer end 60f can bias the blade 30f radially outward. This will prevent the bottom 78f of the blade 30f from resting on the bottom of the groove 52c.

Referring again to FIGS. 2 and 3, the retaining clip 54 can be formed to define a plurality of circumferentially adjacent fingers. The exemplary retaining portion 62 is formed by the plurality of circumferentially adjacent fingers 94 extending radially inward from the disc portion 56. The exemplary fingers 94 can fit into an annular groove 96 defined by the disk 50. FIG. 9 shows another embodiment in which the retaining clip 54f can include fingers 94f. A radially inward end 98f of the fingers 94f can connect to the disk 50 through a second snap-fit connection. For example, the radially inward end 98f can be connected to a part 100f of the disk 50f as the finger 94f is received in the groove 96f. The inner end 98f can be used as a "pull tab" for the removal of the retaining clip 54f. By lifting and pulling on the inner end 98 with a tool, such as a pair of pliers, the spring portion of the clip 54f is deformed radially outward such that the detent feature can be lifted over feature 100f and then the lifted under the feature 72f.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A bladed disk assembly comprising:
   a disk centered on an axis and having at least one groove extending along said axis;
   a blade received in said groove;
   a retaining clip that includes a disc portion contacting said blade and limiting movement of said blade along said axis, and a retaining portion radially inward of the disc portion, the radially inwardly disposed retaining portion extending a length along said axis, wherein said radially inwardly disposed retaining portion is a variable distance from said axis along said length to define either an axially extending convex portion or an axially extending concave portion that is engaged with respectively either an axially extending concave portion or an axially extending convex portion of said disk through a snap-fit;
   wherein at a first position along said length said retaining portion is a first distance from said axis, at a second position along said length said retaining portion is a second distance from said axis greater than said first distance, at a third position along said length said retaining portion is a third distance from said axis less than said second distance, and wherein part of said disk is positioned directly between said first position and said third position along said axis.

2. The bladed disk assembly of claim 1 wherein said retaining clip further comprises:
   a plurality of circumferentially adjacent fingers extending radially inward, said plurality of circumferentially adjacent fingers fitting into an annular groove defined by said disk.

3. The bladed disk assembly of claim 1 wherein said retaining clip further comprises:
   at least one pull-tab for removing said retaining clip from said disk.

4. A bladed disk assembly comprising:
   a disk centered on an axis and having at least one groove extending along said axis;
   a blade received in said groove; and
   a retaining clip that includes a disc portion contacting said blade and limiting movement of said blade along said axis, and a retaining portion radially inward of the disc portion, the radially inwardly disposed retaining portion extending a length along said axis, wherein said radially inwardly disposed retaining portion is a variable distance from said axis along said length to define either an axially extending convex portion or an axially extending concave portion that is engaged with respectively either an axially extending concave portion or an axially extending convex portion of said disk through a snap-fit;
   wherein said retaining clip is operable to elastically deform during engagement with said disk;
   wherein at a first position along said length said retaining portion is a first distance from said axis, at a second position along said length said retaining portion is a second distance from said axis less than said first distance, at a third position along said length said retaining portion is a third distance from said axis greater than said second distance, and wherein part of said disk is positioned directly between said first position and said third position along said axis.

5. The bladed disk assembly of claim 4 wherein
   the disc portion is at least partially arcuate and centered on said axis, said disc portion extending radially relative to said axis from an inner end to an outer end.

6. The bladed disk assembly of claim 4 wherein said retaining portion is integrally-formed and unitary with said disc portion.

7. The bladed disk assembly of claim 4 wherein said retaining portion overlaps itself along said length.

8. The bladed disk assembly of claim 4 further comprising:
   a retaining ring limiting movement of said retaining clip relative to said disk.

9. The bladed disk assembly of claim 4 wherein a radially-outer end of said retaining clip is curled and contacts a radially-inner side of a platform of said blade.

10. The bladed disk assembly of claim 4 wherein said disc portion bows along said axis and defines a radially sliding contact engaging said blade, said disc portion being operable to deform during operation.

11. The bladed disk assembly of claim 10 wherein said sliding contact is arcuate in a cross-section including said axis.

12. The bladed disk assembly of claim 10 wherein said retaining portion limits radially inward movement of said disc portion.

13. The bladed disk assembly of claim 10 further comprising:
   a seal member positioned between said disc portion and said blade, radially inward of said sliding contact.

14. A method comprising the steps of:
   forming at least one groove in a disk centered on an axis wherein the at least one groove extends along the axis;
   positioning a blade in the groove; and contacting the blade and limiting movement of the blade along the axis with a retaining clip engaged with the disk through a snap-fit;

wherein the retaining clip includes a disc portion that contacts said blade and limits movement of said blade along the axis, and a retaining portion radially inward of the disc portion, the radially inwardly disposed retaining portion extending a length along said axis, wherein said radially inwardly disposed retaining portion is a variable distance from said axis along said length to define either an axially extending convex portion or an axially extending concave portion that is engaged with respectively either an axially extending concave portion or an axially extending convex portion of said disk through the snap-fit;

wherein at a first position along said length said retaining portion is a first distance from said axis, at a second position along said length said retaining portion is a second distance from said axis less than said first distance, at a third position along said length said retaining portion is a third distance from said axis greater than said second distance, and wherein part of said disk is positioned directly between said first position and said third position along said axis.

15. The method of claim 14 further comprising the step of: wrapping the retaining clip around part of the disk.

16. The method of claim 14 further comprising the step of: bowing the disk portion outwardly from the blade along the axis.

17. The method of claim 14 further comprising the step of: positioning a seal between the retaining clip and the blade.

18. The method of claim 14 further comprising the step of: biasing the blade radially outward with the retaining clip.

19. The method of claim 14 further comprising the step of: defining a second snap-fit connection between the retaining clip and the disk.

\* \* \* \* \*